United States Patent
Tillotson

(10) Patent No.: US 7,650,268 B2
(45) Date of Patent: Jan. 19, 2010

(54) SIMULATING ION IMPINGEMENT

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1126 days.

(21) Appl. No.: 10/886,921

(22) Filed: Jul. 8, 2004

(65) Prior Publication Data

US 2006/0006324 A1    Jan. 12, 2006

(51) Int. Cl.
G06F 7/60    (2006.01)
G06G 7/48    (2006.01)
B01D 59/44   (2006.01)

(52) U.S. Cl. ............... 703/8; 703/2; 703/6; 250/281; 250/282; 250/291; 250/298

(58) Field of Classification Search .......... 703/2, 703/6, 8; 250/281, 282, 291, 298
See application file for complete search history.

(56) References Cited

U.S. PATENT DOCUMENTS 5,942,682 A * 8/1999 Ghetzler et al. ............ 73/147
6,193,194 B1 * 2/2001 Minovitch ............... 244/171.3
H002171 H * 9/2006 Adams et al. ............... 703/2

OTHER PUBLICATIONS

"Thermal Modeling of an Ion Thruster", Jonathan Lee Van Noord, University of Michigan, 1999.*
Solar Power Satellite System Definition Study, Final Report, Jun. 1980.

* cited by examiner

Primary Examiner—Paul L Rodriguez
Assistant Examiner—Nithya Janakiraman

(57) ABSTRACT

A method and a computer software program for predicting and modeling ion flux colliding with an ion-propelled vehicle traversing a magnetic field predicts a colliding ion path based upon an ion exhaust velocity, an ion charge-to-mass ratio, and a localized magnetic field vector. An ion-propelled vehicle path is predicted based upon a selected trajectory and a vehicle velocity vector. An ion plume is transformed based upon the predicted colliding ion path. The ion-propelled vehicle is projected into the transformed ion plume. The flux is calculated at a silhouette of the projected vehicle.

42 Claims, 6 Drawing Sheets

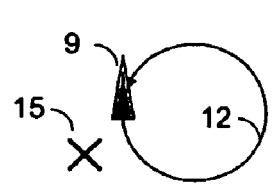
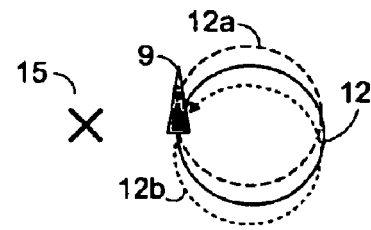
FIG. 1a
(Prior Art)
FIG. 1b
(Prior Art)
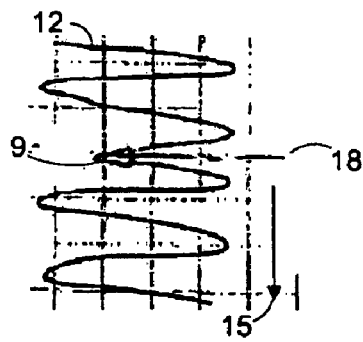
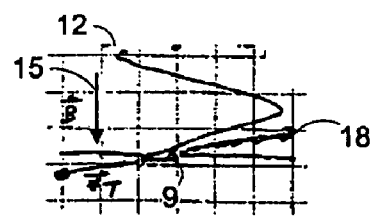
FIG. 2a
(Prior Art)
FIG. 2b
(Prior Art)
FIG. 3

60

| | | |
|---|---|---|
| Ion atomic mass (amu) | 40 | 63 |
| Ion mass (kg) | 6.64121E-26 | 66 |
| keV | 1.5 | 69 |
| J | 2.4E-16 | 72 |
| v | 85015.29274 | 75 |
| Isp | 8666.186824 | 78 |
| Ion velocity (m/s) | 85015.29274 | 81 |
| Ion charge (Cb) | 1.60E-19 | 84 |
| Radius (km) from planet center | 7371 | 87 |
| Magnetic field (nT) | 3.00E+04 | 90 |
| Magnetic field (T) | 3.00E-05 | 93 |
| Radius of gyration (m) | 1.18E+03 | 96 |
| Radius (km) | 1.18 | 99 |
| Circumference (km) | 7.39 | 102 |
| Thruster half-angle (degrees) | 2.865 | 105 |
| Full angle (radians) | 0.1 | 108 |
| Vehicle height (m) | 11 | 111 |
| Fraction of ions hitting vehicle | 0.014883664 | 114 |
| Propellant used (kg) | 1000 | 117 |
| Fluence (kg) | 14.88366449 | 120 |
| Charge fluence (Cb) | 3.59E+07 | 123 |
| Deposition current (A) | 0.760924547 | 126 |
| Time for ions to circle (sec) | 8.69E-02 | 129 |
| G | -6.67E-11 | 132 |
| M: mass of central body (kg) | 5.98E+24 | 135 |
| orbital speed (m/s) | 7356.145375 | 138 |
| Distance orbited in one cycle (m) | 6.39E+02 | 141 |
| Fraction of cycle to impact (tweak to minimize error) | 8.95E-01 | 144 |
| Time to impact (s) | 7.78E-02 | 147 |
| Angle traveled (radians) | 4.92E-01 | 150 |
| Angle ions subtend (radians) | 5.62E+00 | 153 |
| Total (radians) - s/b 2pi | 6.11E+00 | 156 |
| Half-angle of ions to velocity (deg) | 14.1 | 159 |
| Distance ions travel to impact (m) | 6.61E+03 | 162 |
| Distance JIMO travels to impact (m) | 5.72E+02 | 165 |
| In-plane effective beam distance (m) | 7.76E+02 | 168a |
| Cross-plane effective distance (m) | 6.61E+03 | 168b |

| | s @ probability density function=0.5% |
|---:|:---|
| -2.575834515 | this is number of std.dev. at 25 degrees – gives 99% within +- 25 degrees |
| | |
| 10 | max gimbal angle (degrees) |
| 14 | angle below horizon for return to JIMO at 1000 km (degrees) |
| 4 | α: angle off beam axis for returning ions when gimbal is maximally deflected (degrees) |
| -0.412133522 | this is the number of std. dev. at α |
| | |
| 0.680241639 | this is the fraction of beam that's outside angle α from center (above and below) |
| | |
| 0.366460129 | this is the beam pdf at angle α off center (in fractions of total per std. dev.) |
| | |
| 0.39894228 | this is the beam pdf at the beam center, i.e. angle zero (in fractions of total per std. dev.) |
| 0.436332313 | radians in 25 degrees |
| -5.903377856 | standard deviations per radian (close to beam center, anyway) |
| 34.84987012 | square std. devs per steradian (close to beam center) |
| | |
| 444889 | Spacecraft frontal area (m2) |

FIG. 6b

SIMULATING ION IMPINGEMENT

FIELD OF THE INVENTION

This invention relates generally to ion thrusting technology and, more specifically, to ion impingement control.

BACKGROUND OF THE INVENTION

While most current satellites use a chemical bipropellant propulsion system, a XIPS-equipped satellite instead uses the impulse generated by a thruster ejecting electrically charged particles at high velocities. XIPS requires only one propellant, xenon, and does its stationkeeping job using a fraction of that required by a chemical propellant system.

The heart of the XIPS is the ion thruster, measuring less than 10 inches across. Two other key units include a tank containing xenon gas and a power processor. Thrust is created by accelerating the positive ions through a series of gridded electrodes at one end of the thrust chamber. The electrodes, known as an ion extraction assembly, create more than 3,000 tiny beams of thrust. The beams are, to some extent, prevented from being electrically attracted back to the thruster by an external electron-emitting device called a neutralizer.

For example, Ions ejected by the Hughes-designed XIPS travel in an invisible stream at a speed of 30 kilometers per second (62,900 miles per hour), nearly 10 times that of its chemical counterpart. And, because ion thrusters operate at lower force levels, attitude disturbances during thruster operation are reduced, further simplifying the stationkeeping task.

Chemical thrusters in use today are limited by how much energy is released during the combustion process. Ion thrusters are dependent on the amount of electrical power available. More power means faster-moving ions and higher thrust. The Boeing 601HP XIPS uses 500 watts from the satellite's 8-kilowatt solar array. For the Boeing 702 model, XIPS uses 4,500 watts from the 10- to 15-kilowatt solar array. XIPS operations have no effect on broadcasting and telemetry operations.

A typical satellite will use up to four XIPS thrusters (two primary, two redundant) for stationkeeping, all connected to the same xenon supply. Each primary device will be switched on and off by a smart power unit that monitors and diagnoses operations automatically. In normal operation, each Boeing 601HP ion thruster will operate for approximately 5 hours per day. Each Boeing 702 ion thruster will operate for approximately 30 minutes per day.

An ion thruster moves ions by electrostatic repulsion. Xenon propellant enters from a nozzle. A cathode emits electrons that slam into the xenon atoms knocking loose an electron and creating positive xenon ions. Ions respond to magnetic and electric fields, and these ions are attracted to a positive grid at the back of the firing chamber. The ions are pushed by gas pressure through holes in the positive grid. Then the electric field between the positive and negative grids accelerates the ions and sprays them out the back. The grid's electric field accelerates the ions into a ghostly blue beam traveling at about 60,000 miles per hour. The electrons then are introduced into the flow to neutralize the beam. One problem with the use of an ion thruster is damage and loss of performance due to impingement of ion plumes on spacecraft.

The problem arises from the effect of Earth's magnetic field on the ions that are ejected by an ion thruster. Like any charged object moving in a magnetic field, ions experience a force that is perpendicular to their velocity and to the magnetic field:

$$F = qv \times B \tag{1}$$

where boldface indicates a vector quantity, F denotes force, q is electric charge, v is velocity, and B is magnetic field. Ions moving non-perpendicular to the magnetic field follow a spiral path. Those moving perpendicular to the magnetic field travel in a circle. The size of the circle followed by a charged object is given by:

$$R = mv/(qB) \tag{2}$$

where R is the circle's radius and m is the mass of the particle. A stronger magnetic field makes the circles smaller.

Ions moving in a circle can return to strike the spacecraft from which they were ejected. At GEO altitude, the Earth's magnetic field is weak: less than 300 nanoTesla. Furthermore, thrusters used to date use xenon as propellant, so the ions are relatively massive. The result is that prior thrusters eject ions that follow very large circles: over 2000 km circumference at Isp of 6500 sec. In addition, present-day ion thrusters do not shoot ions out in a tightly collimated beam; so the ions spread out as they travel. Even when the thrust vector is perpendicular to the local magnetic field, the ions travel a large circle and the beam diverges strongly so the ion stream is greatly diminished in intensity when it returns to the spacecraft.

In future applications, ion impingement may be more significant than in GEO altitudes. An example will illustrate the problem. The Jupiter Icy Moons Orbiter (JIMO) is a $3 billion NASA program that will use about 10 metric tons of xenon during its mission. The planned initial orbit of JIMO is a circle 1000 km above the Earth. The magnetic field at that altitude is about 50,000 nanoTesla. JIMO thrusters will expel xenon ions at 6500 sec of Specific Impulse (Isp) (~64 km/sec). These ions will travel about 10.8 km before returning to the spacecraft. Assuming the ion beam's divergence angle is 0.1 radian (full width), the beam width after one cycle is 1.08 km. Assuming the beam is mostly perpendicular to the field lines, a 10 meter wide spacecraft (reasonable for JIMO's solar arrays plus high-gain antenna) catches ~1% of the beam.

There are several consequences. One problem is lost thrust: the ions striking the spacecraft carry momentum and strike from the front, destroying 1% of the nominal thrust. Dispelling heat is another problem: JIMO has about 100 kW of kinetic power in the ion beam, so the impinging ions add ~1 kW of thermal load to the vehicle's radiators. This requires more radiator area, and therefore more mass. A third problem is erosion: if its ion thruster expels 1 metric ton of Xe getting from LEO to higher orbit, then JIMO catches around 10 kg of xenon ions at 64 kilometers per second. If the ion impacts cause a comparable mass of material to be sputtered off, the spacecraft's coatings could be seriously degraded. If some of the sputtered material collects on optics or other sensitive surfaces, mission performance could be compromised. A fourth problem is charge deposition: 10 kg of xenon ions carry a total charge of 7.54 million coulombs. Given the nominal performance of JIMO (eighteen months to spiral out of Earth orbit), the charging rate is 0.16 amps. This is not a lot by itself, but it is a non-trivial addition to the charging rate due to the natural environment. Conductive coatings would suffer rapid erosion due to the ion impingement, and, therefore, would need to be thicker to dissipate surface charge.

What are needed are a method and an apparatus for avoiding ion impingement on vehicles using ion thrusters.

SUMMARY OF THE INVENTION

To eliminate or minimize the affects of ion impacts on an ion propelled vehicle, a method and a computer software program are provided for predicting and modeling ion flux colliding with an ion-propelled vehicle traversing a magnetic field predicts a colliding ion path based upon an ion exhaust velocity, an ion charge-to-mass ratio, and a localized magnetic field vector. An ion-propelled vehicle path is predicted based upon a selected trajectory and a vehicle velocity vector. An ion plume is transformed based upon the predicted colliding ion path. The ion-propelled vehicle is projected into the transformed ion plume. The flux is calculated at a silhouette of the projected vehicle.

The method comprises a system for calculating the ion flux that results from a given combination of thruster plume pattern, mass flow rate, ion exhaust velocity, ion charge-to-mass ratio, location in the planetary magnetic field (which determines field strength and direction), and orientation of the plume axis relative to the magnetic field.

Another embodiment of the method selectively employs strategies to exploit design features and methods for designing spacecraft to accommodate the effect of ion impingement. Such design features include the optimizing of conductive coatings to minimize charge buildup that could lead to electrostatic discharge; configuring radiator surfaces to dissipate the additional heat load from ion impingement; optimizing propellant flow or propulsive thrust to cancel the effect of lost thrust due to ion impingement. Erosion rates of materials are selected in accord with the embodiment of the invention that do not adhere to spacecraft optics when the materials are eroded by ion impingement and design configurations are selected that minimize the spacecraft cross-section in the direction of maximum ion flux (usually the direction of thrust). The methods optimize the spacecraft configuration and the ion flux calculation, above, to determine the charge deposition rate, the heating rate, the thrust loss, and the erosion rate that must be accommodated by the design.

Another preferred embodiment of the invention optimizes variable parameters in flight to minimize ion impingement. The system exploits strategies that include turning off the thrusters, reducing the mass flow to the thrusters, or orienting the thrusters (e.g. by gimbals or by changing the spacecraft attitude) to reduce the fraction of ions that travel perpendicular to the magnetic field.

Another preferred embodiment of the invention includes a software tool that performs the ion flux calculation, above, and applies it to a model of the spacecraft to determine the charge deposition rate, the heating rate, the thrust loss, or the erosion rate at a particular point in space. A preferred embodiment of this software tool inputs data about the spacecraft's trajectory, applies the flux calculation to numerous points along the trajectory, and reports the maximum rate and the integrated total for each effect over the whole trajectory.

Another preferred embodiment inputs a 3D model of the spacecraft and reports maximum rates and integrated totals for each effect on each exposed surface element of the spacecraft, such as a radiator panel or a solar array.

Another preferred embodiment inputs data about the spacecraft, its initial trajectory, and the ion thrust profile; automatically applies selected operational techniques above (e.g. turn off the thrusters) to the model when certain criteria are met (e.g. when ion impingement heating exceeds a user-specified rate); computes the effect of the applied techniques to estimate the resulting modified trajectory; and repeats the process by applying selected operational techniques at the next point along the modified trajectory where the selected criteria are met. This embodiment reports maximum rates and integrated totals for the ion effects. It allows the user to repeat an analysis after changing some or all of the criteria for applying various operational techniques; this allows rapid iteration of "what if" scenarios to optimize a mission design.

Another preferred embodiment incorporates the features above and is implemented as a plug-in module for a more comprehensive mission design tool such as Software Tool Kit (STK). This facilitates many-faceted mission optimization, including such criteria as total radiation exposure in the Earth's radiation belts, planetary shadowing that blocks sunlight to solar arrays, exposure to atomic oxygen, total time to complete a maneuver, and visibility of ground-based communication antennas.

As will be readily appreciated from the foregoing summary, the invention provides a method and a computer software program for predicting and modeling ion flux colliding with an ion-propelled vehicle traversing a magnetic field. The method predicts a colliding ion path based upon an ion exhaust velocity, an ion charge-to-mass ratio, and a localized magnetic field vector. An ion-propelled vehicle path is predicted based upon a selected trajectory and a vehicle velocity vector. An ion plume is transformed based upon the predicted colliding ion path. The ion-propelled vehicle is projected into the transformed ion plume. The flux is calculated at a silhouette of the projected vehicle.

BRIEF DESCRIPTION OF THE DRAWINGS

The preferred and alternative embodiments of the present invention are described in detail below with reference to the following drawings.

FIG. 1a is a plan view of an ion track diagram showing a generalized track;

FIG. 1b is a plan view of an ion track diagram showing ion divergence;

FIG. 2a is a side view of an ion track diagram showing ion divergence;

FIG. 2b is a side view of an ion track diagram showing a generalized track;

FIG. 3 is a plan view of an ion track traversing a non-homogenous magnetic field;

FIG. 6a is a spreadsheet configured to calculate ion flux; and,

FIG. 6b is a continuation spread sheet configured to calculate ion flux.

DETAILED DESCRIPTION OF THE INVENTION

Figure 4:
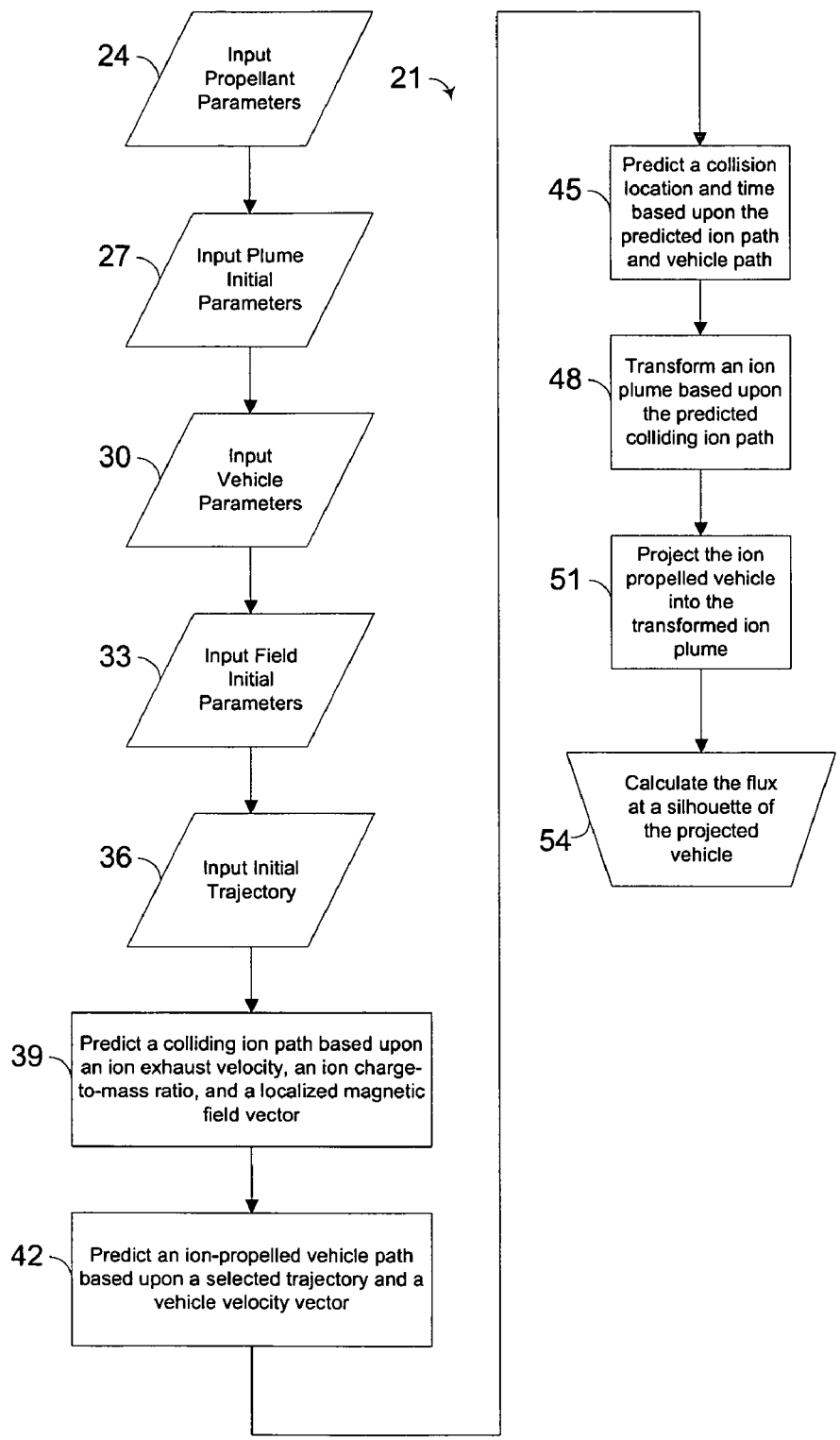
FIG. 4 is a flow chart of a method for calculating ion flux at a silhouette of an ion propelled vehicle.

By way of overview, a method and a computer software program for predicting and modeling ion flux colliding with an ion-propelled vehicle traversing a magnetic field predicts a colliding ion path based upon an ion exhaust velocity, an ion charge-to-mass ratio, and a localized magnetic field vector. An ion-propelled vehicle path is predicted based upon a selected trajectory and a vehicle velocity vector. An ion plume is transformed based upon the predicted colliding ion path.

The ion-propelled vehicle is projected into the transformed ion plume. The flux is calculated at a silhouette of the projected vehicle.

An important point is that although the ion beam diverges in two dimensions (i.e. azimuth and elevation relative to the beam axis), one dimension of divergence does not reduce the flux of ions returning to the spacecraft. Referring to FIG. 1a, As indicated, one problem with the use of an ion thruster is damage and loss of performance due to impingement of ion plumes on spacecraft. The problem arises from the effect of a planet's magnetic field on the ions that are ejected by an ion thruster. Like any charged object moving in a magnetic field, ions experience a force that is perpendicular to their velocity and to the magnetic field:

$$F=q v \times B \qquad (1)$$

where boldface indicates a vector quantity, F denotes force, q is electric charge, v is velocity, and B is magnetic field. Ions moving non-perpendicular to the magnetic field follow a spiral path. Those moving perpendicular to the magnetic field travel in a circle. The size of the circle followed by a charged object is given by:

$$R = mv/(qB) \qquad (2)$$

where R is the circle's radius and m is the mass of the particle. A stronger magnetic field makes the circles smaller.

Referring to FIG. 1a, an ion plume from a ion-propelled vehicle 9 traversing a magnetic field (The magnetic field lines 15 extend into FIG. 1a.) will send a portion of its ions on a gyration orbit 12 allowing the ions to impinge the leading edge of the ion-propelled vehicle 9. Ion-propelled vehicles do not generally have ion plumes forming a beam that perfectly aligns with a resulting thrust vector. That ions do diverge in the plane perpendicular to the magnetic field does not necessarily lessen the impingement problem.

Referring to FIG. 1b, initially as ions spread out from the ion-propelled vehicle 9 at distinct angles may each impinge based upon the gyration orbits 12, 12a, and 12b and the beam becomes more diffuse. (Again, the magnetic field lines 15 extend into FIG. 1b.) However, all the ions travel in circles with the same diameter and the same point of origin. Thus, divergence that is perpendicular to B does not reduce the ion flux returning to the spacecraft.

Divergence along the field lines does, however, reduce ion flux at the spacecraft. Referring to FIG. 2a, the magnetic field lines 15 are vertical. The axis of the ion plume 18 is perpendicular to the field, i.e. it is in a plane (not shown) perpendicular to the field lines and containing the ion-propelled vehicle 9. Elements of the plume 18 are diverging below the plane. The ions orbits 12 diverging below the plane do not follow circles; rather, they spiral around the magnetic field lines 15, getting farther from the spacecraft with each spiral. Only ions that travel at a small angle below the perpendicular to B return to strike the ion-propelled vehicle 9. Thus, when the plume axis is perpendicular to the magnetic field, then greater divergence along the field lines yields less thrust due to the flux colliding at the ion-propelled vehicle 9.

Unfortunately, divergence along the field lines increases the range of conditions in which ions will strike the ion-propelled vehicle 9. Referring to FIG. 2b, where the beam is perfectly collimated, then ions would only return to the spacecraft when the beam is perpendicular to the field. However, if the beam diverges as shown in FIG. 2b, then pointing the plume axis slightly off-perpendicular to the field does not eliminate the ion impingement. Here, as illustrated, the axis of the plume 18 points several degrees above the plane (not shown) perpendicular to the magnetic field lines 15 and containing the ion-propelled vehicle 9. However, because the beam diverges along the field lines, parts of the plume that spread below an axis of the plume 18 end up traveling in gyration orbit 12 such that the ions will return to strike the ion-propelled vehicle 9.

Another factor in the study of ion impingement that should be understood is ion flux at the spacecraft is non-uniformity of the magnetic field. Referring to FIG. 3, if the magnetic field magnitude changes strongly from a first magnetic field strength 15a, to a second magnetic field strength 15b, over the diameter of one ion orbit 12, then the ion will not follow a circle. In regions with a stronger field 15a, the ion's path 12 curves more strongly than in regions with weaker field 15b. The deviation from a circle, however, is only a few meters for typical thruster ion paths in, for example, Low Earth Orbit. The variation in the magnetic field strength is not enough to usefully reduce the number of ions striking the spacecraft. Therefore, while variations in magnetic field strength do change the impingement value, such variations are not sufficient to significantly affect the impingement values.

To develop a model to predict ion impingement, a method 21 to calculate ion flux at a silhouette representative of the ion-propelled vehicle is necessary. The method 21 commences with the collection of the specifications of parameters relevant to the calculation. Thus, at a block 24, the propellant parameters are entered. Such parameters include the ion atomic mass in atomic mass units, e.g. argon at 40, xenon at 130, and cesium at 133. In the simulation software, radio buttons might represent the several suitable choices for ion propellant selections. Internal checks would also be present to cross-check the ion mass for xenon at $2.158 \text{ g} \times 10^{-22}$ as the atomic mass divided by Avogadro's number.

Just as with the propellant, the generated plume parameters are input at a block 27. Plume parameters will include a specific impulse relating to the actual generated plume. Also, like the propellant numbers, internal checks are in place to enhance the data entry. For instance, the specific impulse readily yields the ion velocity when multiplied by gravitational acceleration.

Importantly, however, additional information is necessary to fully describe the plume. A probability density function is used to give the "shape" of the ion plume. In mathematics, a probability density function serves to represent a probability distribution in terms of integrals. If a probability distribution has density f(x), then intuitively the infinitesimal interval [x, x+dx] has probability f(x) dx. A probability density function can be seen as a "smoothed out" version of a histogram: if one empirically measures values of a random variable repeatedly and produces a histogram depicting relative frequencies of output ranges, then this histogram will resemble the random variable's probability density (assuming that the variable is sampled sufficiently often and the output ranges are sufficiently narrow). To describe the ion plume, a probability density that is a function of an angle at in polar coordinates is a useful way to describe the plume emanating as it does from the ion-propulsion motor.

The geometry and mass of the ion-propelled vehicle is necessary to simulate both its movement and the silhouette it presents to the returning portion of the ion plume. At a block 30, the parameters defining the vehicle geometry and mass are entered. In a presently preferred embodiment, neither the silhouette nor the mass is a static number but rather each may vary in the course of a mission. For example, one of the optimization strategies requiring testing will be to reorient the ion-propelled vehicle in the plume, thereby changing the silhouette presented to the returning ions, another will be the intermittent firing of the ion-propulsion motor thereby changing the mass of the vehicle by expulsion of ions. In either case, a computer's ability to perform reiterative calculations allows calculation for the varying mass and silhouette problems. For this reason, the parameters entered for geometry will include variable functions.

At a block 33, the magnetic field characteristics are entered. Additionally, to the extent that variation in the magnetic field is significant, the function by which the field strength varies with position is accounted for. The field strength and direction is necessary to predict the movement of an ion in the field and the field direction provides a convenient frame of reference for the calculations in the presently preferred embodiment.

An initial trajectory is entered at a block 36. The trajectory parameters include, at least, a velocity vector, the radius from a planet center, and the planet mass. These parameters along with the instantaneous mass of the vehicle define a predicted orbit for the ion-propelled vehicle, the relation predicting gravitational motion being well-known.

At a block 39, the predicted path of a single ion ejected from the ion-propulsion motor along the axis of the plume and in a plane perpendicular to the magnetic field is calculated. The ion mass and velocity, along with the magnetic field strength determines the exemplary circular path. This exemplary circular path is used in the presently preferred embodiment as a template for the remainder of the calculated predictions. The predicted path is characterized by a gyration radius, a circumference, and ion-transit duration for a single cycle of the path.

At a block 42, the movement of the ion-propelled vehicle is calculated during the ion-transit duration. As indicated in the discussion of the block 36, orbit trajectory prediction is based upon a well-known gravitational relationship. The mass of the vehicle will decrease predictably as the ion-propulsion motors emit ions. The force vector resulting from the emission of ions by the ion-propulsion motors is also easily calculated and thus the orbital movement of the vehicle during the ion-transit duration is readily calculable.

By definition, the ion traveling along its predicted path strikes the ion-propelled vehicle at a point. The location of the point along the predicted path of the ion is readily calculable and therefore the fraction of the predicted path of the ion is similarly calculable. At a block 45, the collision point is calculated and the fraction of the circumference of the predicted path of the ion is determined, thereby determining the length of the path of the ion between expulsion from the ion propulsion motor to collision with the ion-propelled vehicle.

At a block 48, the ion plume probability density function is transformed to produce a cone representing the divergence of the ion plume to a range equal to the fraction of the circumference of the predicted path of the ion. The probability function is based on the half-angle of the ion plume.

A beam half-angle is determined by the probability density function that was used to describe the ion-plume. For instance, where a probability density function of 0.05% is used to describe the plume, the number of standard deviations within a 25° half-angle account for 99% of the output of the ion-propulsion motor. The standard deviations are then used to construct a cone of equivalent probability density for any angle $\alpha$.

At a block 51, a mathematical representation of a surface area of a silhouette of the ion-propelled vehicle is project along the axis of the cone at a distance equal to the fraction of the circumference of the predicted path of the ion. The projected silhouette area intersects the cone to define a steradian measure of the projected silhouette area having a value of $\theta$ in steradians. Steradians are a measure of the angular 'area' subtended by a two dimensional surface about the origin in three dimensional space, just as a radian is a measure of the angle subtended by a one dimensional line about the origin in two dimensional (plane) space. A sphere subtends 4 pi steradians about the origin. By analogy, a circle subtends 2 pi radians about the origin. The solid angle of $\theta$ in steradians has a triangular cross-section with an apex angle of $\theta/2$ radians or a corresponding half-angle of $\theta/4$ radians.

At a block 54, the probability density function that describes the plume is solved for the probability within the half-angle of $\theta/4$ radians and the resulting probability is multiplied by the ion flow rate to develop an ion flux at the silhouette of the projected vehicle. By varying the dimension of the silhouette through changes of attitude, pitch, or yaw, by changing ion flow rates, or by selecting distinct trajectories, the method allows the recalculation of resulting ion flux to suitably select each of the variables to minimize ion impingement.

Figure 5A:
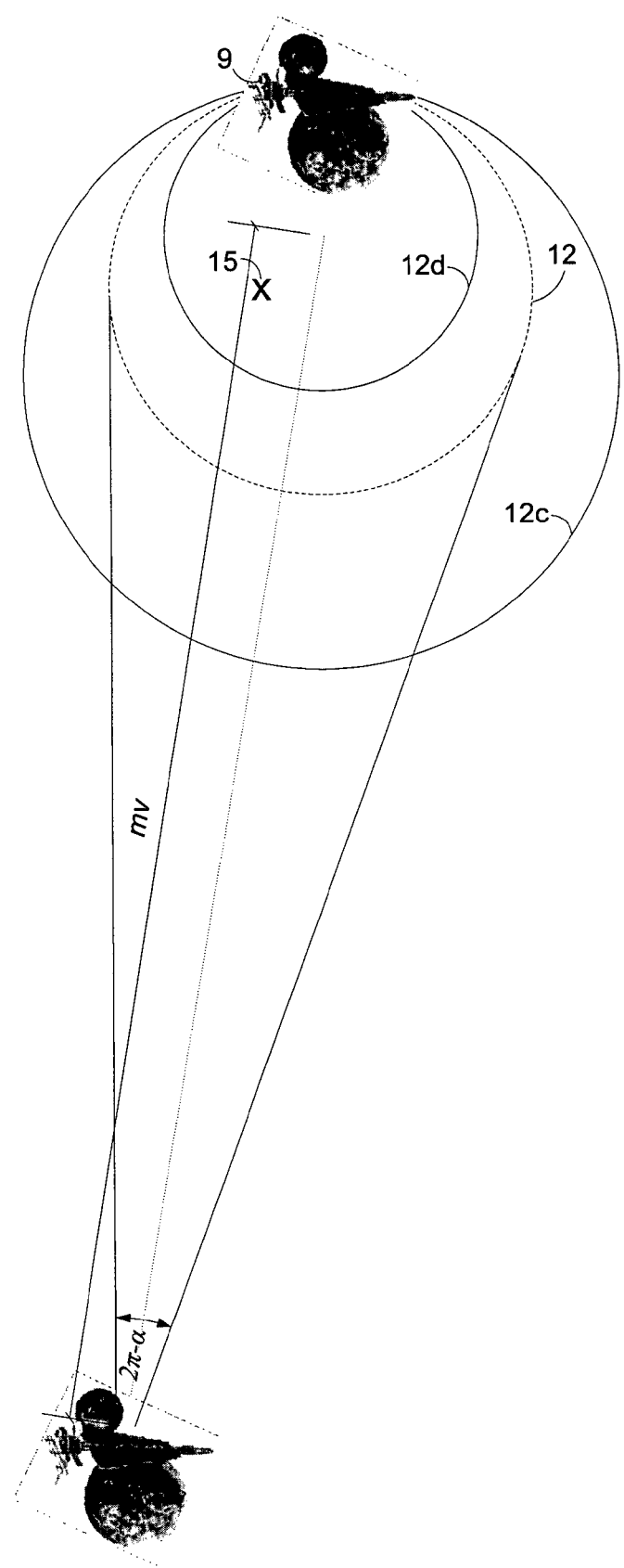
FIG. 5a is a plan view of an ion track showing ion divergence.

Referring to FIG. 5a, the ion-propelled vehicle 9 issues a plume of ions (not pictured) that in the presence of a magnetic field 15 curve to return impinging upon a leading edge of the ion-propelled vehicle. Predicting the ion impingement is enabled by an observation that ions that issue from the plume to impinge upon the ion-propelled vehicle 9 represent a generally definable portion of the plume. Within the plane of the ion gyration path 12, ions that strike the ion-propelled vehicle are gyrations paths between a first arbitrary ion gyration path boundary 12c and a second gyration path boundary 12d.

One observation that has proven useful in predicting the ion flux at the ion-propelled vehicle has been the angular relationship between the movement of the ion-propelled vehicle in orbit around the planet from which the magnetic field emanates and the diameter of the path of ion gyration. The ion gyration path 12 forms the side of a triangle opposite the angle indicative of the fall of the ion-propelled vehicle in its orbit, an angle arbitrarily assigned a magnitude of $2\pi-\alpha$ in radians. The ion-propelled vehicle travels a distance mv equal to the orbital speed of the ion-propelled vehicle times the duration of the ion traveling from the ion-propulsion device to the point of collision along the ion gyration path 12. The point of collision may then be described as the angle $\alpha$ that the ions subtend. This relationship allows prediction of ion flux based upon knowledge of the angle $\alpha$, and the ion-propulsion plume parameters.

Figure 5B:
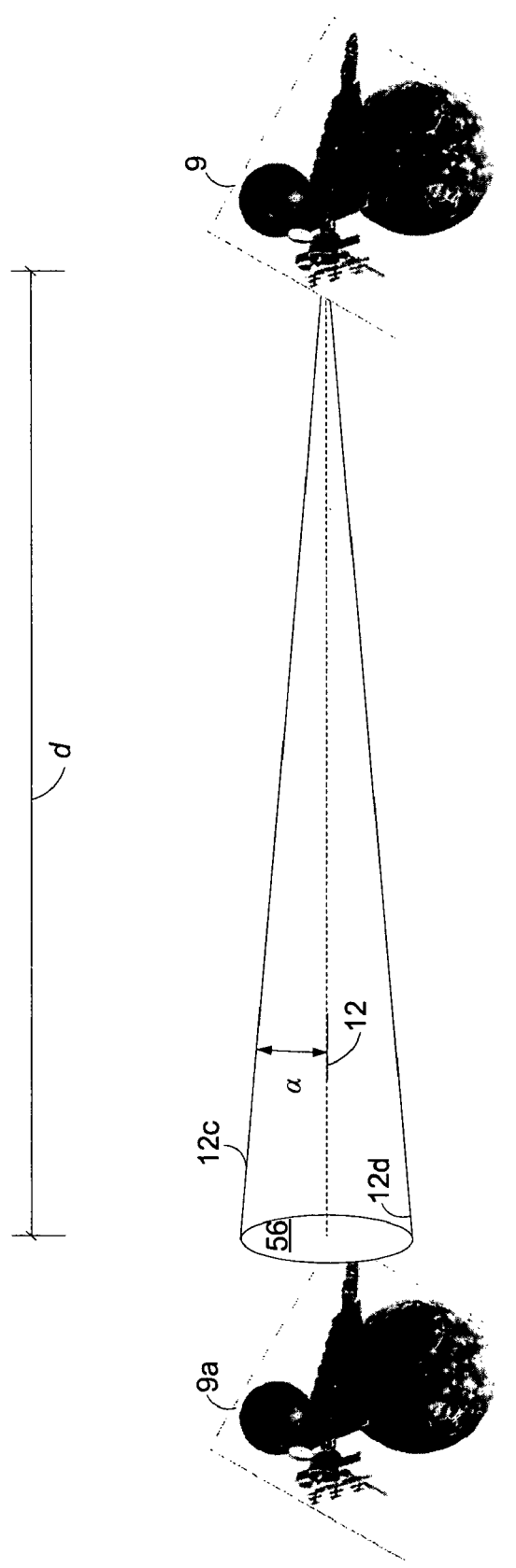
FIG. 5b is a plan view of an ion track showing the projection of the ion plume.

A transformation is based upon the examination of the plume in the absence of the magnetic field. Referring to FIG. 5b, the ion-propelled vehicle is portrayed as the source of ion gyration paths 12, 12c, and 12d. At a distance d equal the fraction of the gyration path 12 representing the distance an ion travels along the gyration path from ion-propulsion motor to impinging collision with the ion-propelled vehicle 9, a circle 56 with area equal in magnitude to an area of a silhouette presented for ion impingement by the ion-propelled vehicle 9 is projected. To aid in the visualization of the mathematical process, an image of the ion-propelled vehicle 9a is projected at the gyration path 12 at distance d. As a result, an angle $\theta/4$ representing the half angle of a resulting cone can be readily calculated. As described above, the probability corresponding to the half angle $\theta/4$ is calculated using the probability density function describing the ion plume.

A spreadsheet 60 is used to model ion impingement for an ion-propelled vehicle in a magnetic field around earth. Using, for example, Argon with an atomic mass of 40, entered at a block 63, the software supporting the spreadsheet calculates the mass of an ion by division by Avogardro's number and then outputs the result in kilograms at a block 66.

For a case of a solar powered satellite earth orbit vehicle, a reasonable value to express the energy imparted on an ion by the ion-propulsion motor might be 1.5 keV and that value is entered at a block 69. To solve for the work performed by that energy upon the ion, the energy entered at the block 69 is multiplied by the charge of a single electron $1.6 \times 10^{-19}$ Coulombs (stored at a block 84) to yield $2.4 \times 10^{-16}$ Joules to be output at a block 72. The square root of the quantity of two times the work performed (entered at the block 72) divided by the atomic mass (entered at the block 66) yields the velocity of the ions leaving the ion-propulsion motor and output at blocks 75 and 81. Dividing the velocity (entered at the block 75) by the acceleration of gravity yields a constant commonly used in rocket science to describe the efficiency of a thruster, the specific impulse or Isp and the specific impulse is output at a block 78.

The magnetic conditions at the altitude of orbit are then entered. At a block 87, a radius from the center of earth is entered. Similarly, the magnetic field strength in nanoTeslas present at the radius is also entered at a block 90. Advantageously, the software supporting the spreadsheet converts the entered magnetic field strength at the block 90 into Teslas outputting that quantity at a block 93.

Given the product of the ion mass entered at the block 66, times the ion velocity entered at a block 75; and dividing the resulting product by the strength of the magnetic field in Teslas at the block 93 and further dividing by the ionic charge at the block 84 yields a radius of gyration in meters and output at a block 96. Multiplying that result (expressed in kilometers) by $2\pi$ yields a circumference output at a block 102.

The divergence of a ion-propulsion motor is measurable; the profile of the ion current onto striking a probe was measured. These curves were then used to calculate the half-angle of the jet divergence for the ion propellant. The value of $\alpha/2$ is determined with a condition that 99% of the ion flow has fallen within the cone with the vertex angle $\alpha$. The divergence half angle is entered, in degrees, at a block 105, triggering an output value in radians for a full angle at a block 108.

A height of the ion-propelled vehicle is entered, in meters, at a block 111. A probability density representing a fraction of the ions striking the vehicle is output at a block 114 and is calculated as the quotient of the height of the ion propelled vehicle entered in the block 114, divided by the product of the gyration circumference in meters times the full angle in radians at the block 108. When the propellant used is entered at a block 117, a deposition current representing the ions impinging the ion-propelled vehicle is calculated at a block 126. Calculating the deposition current is dependent upon the fluence of the ion-propulsion motor, which is calculated, and then output at a block 120 as the fraction entered at the block 114 times the mass of propellant entered at the block 117. A charge fluence in Coulombs is calculated at block 123 by dividing the fluence at block 120 by the ion mass entered at the block 66 multiplied by the ion charge at the block 84 and that determines the deposition current in Amperes output at a block 126.

The velocity of the ions entered at the block 81 determines the amount of time necessary to cover the circumference of the gyration of the ions recorded at the block 102, and that duration is output at a block 129. Simultaneously, the ion-propelled vehicle moves forward in an orbit defined by the mass of the planet or central body entered at a block 135, a radius to the ion-propelled vehicle from the center of the central body in meters, entered at the block 87, and the gravitational constant G, here entered at a block 132, and the mass of the planet, entered at block 135. Given these parameters, the orbital speed is output at a block 138. The distance the ion-propelled vehicle traverses during one cycle of an ion traveling the gyration circumference (at block 141) is the product of the orbital speed, at the block 138 and the duration, at the block 129.

In fact, the ion does not travel the whole of the cycle as the ion-propelled vehicle travels to meet it. Having predicted a path for the ion and also for the vehicle, an intersection point can be reckoned and with it, a fraction of the cycle representing the path from the ion-propulsion motor along the circumferential path and then into collision with the ion-propelled vehicle. That fraction, in decimal form is entered in a block 144. When multiplied by the fraction, the duration, at the block 129, then becomes the duration of the ion's transit of the path from the ion-propulsion motor along the circumferential path and then into collision with the ion-propelled vehicle, and is output at a block 147.

The angle traveled in radians is a significant measurement, and is output at a block 150. The "angle traveled" describes the drop of the ion-propelled vehicle and results from a triangular relationship between the straight-line distance traveled by the ion propelled vehicle (the product of the time to impact recorded at the block 147 multiplied by the rate, i.e. the orbital speed recorded at the block 138) and the diameter of the radius of gyration as side opposite to the angle traveled. The angle is expressed as $2\pi - \alpha$ in radians.

The angle $\alpha$ that the ions subtend is output at a block 153. The angle $\alpha$ is the angle that the ions must travel to meet the ion-propelled vehicle that has simultaneously traveled $2\pi - \alpha$ in radians. This relationship enables an iterative process. Because the fraction of a cycle, and hence time spent traversing that fraction of a cycle drives the estimate both of the distance the ion-propelled vehicle and the ion travel to meet, an estimate of the fraction that is off will result in a sum of the angles that is either greater or smaller than $2\pi$. By iterating the estimate of the fraction of the cycle and observing this sum, the fraction can be refined to many decimal places. The sum of the blocks 150 and 153 is output at block 156 and compared to $2\pi$.

The angle traveled at the block 150 is halved and converted to degrees and output at a block 159 to display a half angle of ions to velocity. The distance ions travel to impact is output at 162 again the product of speed times time, in this instance is the product of the corrected time to impact at the block 147 multiplied by the ion velocity at the block 81; similarly the distance the ion-propelled vehicle travels to impact displayed at a block 165 is the product of the corrected time multiplied by the orbital speed at the block 138.

The circumference shown at the block 102 is segregated into the distance the ions travel to impact shown at the block 162 and again at a block 168b and labeled "Cross-plane effective distance;" the difference is output to a block 168a and labeled "In-plane effective distance."

Having established the geometry of the ion path relative to the path of the ion-propelled vehicle, the particular characteristics of the ion plume can be applied to the geometry to calculate the anticipated flux that will strike the ion-propelled vehicle. Referring to a propulsion plume spreadsheet 171 in FIG. 6b, an ion propulsion motor with a half angle of 25 degrees and a probability density function of 0.05% can be said to have 2.575 standard deviations within that 25 degree cone as is output at a block 174 of the propulsion plume spreadsheet 171. If the ion-propulsion motor can be operatively gimbaled through 10 degrees of deflection in a given direction, the number 10 is input at a block 177. The half angle of ions to velocity in degrees (FIG. 6a, block 159) is carried into a block 183 for calculation. Thus, the angle off of the beam axis for returning ions when gimbal is maximally deflected (degrees) is the difference between the angles at blocks 177 and 180, which, in this case is 4 degrees.

Solving the probability density function at 4 degrees results in an ion flux at block 186 that is −0.41213 standard deviations from the density at the axis of the ion plume. The remaining probability is outside of the cone defined by the angle at and thus is output at a block 189, in this case there is a 68% of the beam outside of the angle 4 degrees. Given the probability density function for the same ion plume, 37% of the ions emitted travel in that 68% of the plume output at a block 192. At the center of the plume, the percentage of ions is 40%, output at a block 195.

As there are approximately 57.3 degrees per radian, 25 degrees represents 0.436 radians, output at a block 198. The standard deviation can be approximated as a linear function of standard deviations per radian and the approximate slope is output at a block 201. As an area function, the standard deviation per radian is squared to yield a standard deviation per steradian at a block 204.

Where an ion-propelled vehicle has a frontal area of 444889 at a block 207, the area determines the number of steradians at a block 201 at the distance entered in the block 165, thereby completing the model.

For example, where an ion-propelled vehicle has a frontal area of 444889, the area determines the number of steradians the ion-propelled vehicle transects at the distance entered in the block 165. The number of steradians is used to approximate the number of square standard deviations covered by the spacecraft at said distance. The number of square standard deviations is divided by the value of $\pi$ and then transformed by a square root function to compute the average radius of the spacecraft silhouette measured in standard deviations from the center of the plume. The radius in standard deviations is used to approximate the fraction of the plume that lies within the silhouette, e.g. if the plume follows a standard normal probability distribution and the radius is one standard deviation, then the fraction of the plume striking the spacecraft is the square of 0.69 (0.69 is the fraction of a standard normal probability distribution function or p.d.f. within one standard deviation of the mean for a one-dimensional distribution), or 0.48. This fraction is multiplied by the total flux to compute the flux striking the spacecraft, thereby completing the model.

The present invention relates to ion flux calculation. Many specific details of certain embodiments of the invention are set forth in the following description and in FIGS. 1a through 6b to provide a thorough understanding of such embodiments. One skilled in the art, however, will understand that the present invention may have additional embodiments, or that the present invention may be practiced without several of the details described in the following description.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for predicting ion flux colliding with an ion-propelled vehicle traversing a magnetic field, the method comprising using a computer to perform the following:

predicting a colliding ion path based upon an ion exhaust velocity, an ion charge-to-mass ratio, and a localized magnetic field vector;

predicting an ion-propelled vehicle path based upon a selected trajectory and a vehicle velocity vector;

transforming an ion plume based upon the predicted colliding ion path;

projecting the ion-propelled vehicle into the transformed ion plume; and calculating ion flux at a silhouette of the projected vehicle.

2. The method of claim 1, wherein predicting a colliding ion path comprises:

calculating an ion mass based upon an atomic weight of a propellant.

3. The method of claim 2, wherein the predicting a colliding ion path further comprises: calculating an ion momentum based upon ion exhaust velocity and ion mass.

4. The method of claim 3, wherein the predicting a colliding ion path further comprises: calculating a path of an ion in the localized magnetic field based upon ion momentum and a single electron charge.

5. The method of claim 1, wherein the predicting the ion-propelled vehicle path comprises: calculating an orbit based upon a vehicle mass, a vehicle velocity vector, and a gravitational force.

6. The method of claim 5, wherein predicting the ion-propelled vehicle path further comprises: calculating a change in vehicle momentum based upon a specific impulse, an ion mass flow rate, and the vehicle mass.

7. The method of claim 1, wherein the computer further performs predicting a collision time and location, including calculating duration of an ion to complete one circumferential cycle of the predicted colliding ion path including an exhaust point;

projecting an intersection point based upon the predicted colliding ion path and the predicted ion-propelled vehicle path;

calculating a fraction of the of the circumferential cycle representing a portion of the circumferential cycle from the exhaust point to the intersection point; and calculating a collision time by multiplying the duration by the fraction.

8. The method of claim 1, wherein the transforming of an ion plume comprises determining a plume probability density function based upon an alpha angle relative to a plume axis.

9. The method of claim 8, wherein transforming the ion plume, further comprises:

determining a plane including a predicted colliding ion path;

projecting the vehicle velocity vector onto the plane;

projecting the plume axis onto the plane; and determining a plume orientation angle in the plane between the projection of the vehicle velocity vector and the projection of the plume axis.

10. The method of claim 9, wherein the transforming the ion plume further includes: transforming the plume probability density function according to the plume orientation angle.

11. The method of claim 10, wherein the projecting the ion-propelled vehicle into the transformed ion plume includes:

calculating a vehicle silhouette area;

determining a model cone having, a surface, a conic axis, a height, and a base area perpendicular to the conic axis, the base area being equal to the vehicle silhouette area and the height along the conic axis being equal to the portion of the circumferential cycle from the exhaust point to the intersection point; and determining an angle defined between the conic axis and surface.

12. The method of claim 11, wherein the calculating the flux at a silhouette of the projected vehicle includes: calculating a flux density based upon the transformed plume probability density function, the ion mass flow rate, and the model cone.

13. The method of claim 9, wherein the transforming the ion plume further includes: transforming the plume probability density function according to an angular sum of the plume orientation angle and a propulsion gimbal angle.

14. The method of claim 13, wherein the propulsion gimbal angle is an angle selected from a plurality of gimbal angles, the plurality of gimbal angles selected to include a minimum and a maximum gimbal angle.

15. The method of claim 14, wherein calculating the flux at a silhouette of the projected vehicle includes calculating the flux at the silhouette at each of the plurality of gimbal angles.

16. The method of claim 15 further comprising: selecting a gimbal angle for a maneuver, the gimbal angle corresponding to a selected calculated flux at the silhouette from among the fluxes calculated at each of the plurality of gimbal angles.

17. The method of claim 5, wherein calculating the ion-propelled vehicle path further comprises:
designating an initial state and a destination state, the initial state including an initial position, an initial vehicle mass, and an initial velocity, and the destination state including a destination position, a destination vehicle mass, and a destination velocity; and
calculating a change in vehicle momentum based upon a specific impulse, an ion mass flow rate, and a change between the destination state and the initial state.

18. The method of claim 17, wherein the destination state is selected from a plurality of destination states.

19. The method of claim 18, wherein calculating the flux at a silhouette, includes calculating the flux at each of the plurality of destination states.

20. The method of claim 19, the method including selecting a destination state for maneuvering, the selected destination state corresponding to a selected calculated flux at the silhouette.

21. An article comprising a computer-readable medium encoded with a computer program for predicting ion flux colliding with an ion-propelled vehicle traversing a magnetic field, including:
predicting a colliding ion path based upon an ion exhaust velocity, an ion charge-to-mass ratio, and a localized magnetic field vector;
predicting an ion-propelled vehicle path based upon a selected trajectory and a vehicle velocity vector;
predicting a collision time and location;
transforming an ion plume based upon the predicted colliding ion path;
projecting the ion-propelled vehicle into the transformed ion plume; and
calculating the flux at a silhouette of the projected vehicle.

22. The article of claim 21, wherein predicting the colliding ion path includes calculating an ion mass based upon an atomic weight of a propellant.

23. The article of claim 22, wherein predicting the colliding ion path includes calculating an ion momentum based upon ion exhaust velocity and ion mass.

24. The article of claim 23, wherein predicting the colliding ion path includes calculating a path of an ion in the localized magnetic field based upon ion momentum and a single electron charge.

25. The article of claim 21, wherein predicting the ion-propelled vehicle path includes calculating a orbit based upon a vehicle mass, a vehicle velocity vector, and a gravitational force.

26. The article of claim 25, wherein predicting the ion-propelled vehicle path includes calculating a change in vehicle momentum based upon a specific impulse, an ion mass flow rate, and the vehicle mass.

27. The article of claim 21, wherein predicting the collision time and location includes calculating a duration of an ion to complete one circumferential cycle of the predicted colliding ion path including an exhaust point; projecting an intersection point based upon the predicted colliding ion path and the predicted ion-propelled vehicle path; calculating a fraction of the of the circumferential cycle representing a portion of the circumferential cycle from the exhaust point to the intersection point; and calculating a collision time by multiplying the duration by the fraction.

28. The article of claim 21, wherein predicting the collision time and location includes determining a plume probability density function based upon an alpha angle relative to a plume axis.

29. The article of claim 21, wherein predicting the collision time and location includes determining a plane including a predicted colliding ion path; projecting the vehicle velocity vector onto the plane; projecting the plume axis onto the plane; and determining a plume orientation angle in the plane between the projection of the vehicle velocity vector and the projection of the plume axis.

30. The article of claim 29, wherein predicting the collision time and location further includes transforming the plume probability density function according to the plume orientation angle.

31. The article of claim 21, wherein projecting the ion-propelled vehicle includes calculating a vehicle silhouette area; determining a model cone having, a surface, a conic axis, a height, and a base area perpendicular to the conic axis, the base area being equal to the vehicle silhouette area and the height along the conic axis being equal to the portion of the circumferential cycle from the exhaust point to the intersection point; and determining an angle defined between the conic axis and surface.

32. The article of claim 31, wherein projecting the ion-propelled vehicle further includes calculating a flux density based upon the transformed plume probability density function, the ion mass flow rate, and the model cone.

33. The article of claim 21, wherein predicting the collision time and location further includes transforming the plume probability density function according to an angular sum of the plume orientation angle and a propulsion gimbal angle.

34. The article of claim 33, wherein predicting the collision time and location further includes selecting the propulsion gimbal angle from a plurality of gimbal angles, the plurality of gimbal angles selected to include a minimum and a maximum gimbal angle.

35. The article of claim 34, wherein predicting the collision time and location further includes calculating the flux at a silhouette of the projected vehicle including calculating the flux at the silhouette at each of the plurality of gimbal angles.

36. The article of claim 35, wherein predicting the collision time and location further includes selecting a gimbal angle for a maneuver, the gimbal angle corresponding to a selected calculated flux at the silhouette from among the fluxes calculated at each of the plurality of gimbal angles.

37. The article of claim 21, wherein predicting the collision time and location includes designating an initial state and a destination state, the initial state including an initial position, an initial vehicle mass, and an initial velocity, and the destination state including a destination position, a destination vehicle mass, and a destination velocity; and calculating a change in vehicle momentum based upon a specific impulse, an ion mass flow rate, and a change between the destination state and the initial state.

38. The article of claim 37, wherein the an optimal destination state is selected from a plurality of destination states.

39. The article of claim 38, wherein the flux at each of the plurality of destination states is computed.

40. The article of claim 39, wherein a destination state for maneuvering is selected, the selected destination state corresponding to a selected calculated flux at the silhouette.

41. A method comprising using a computer to predict ion flux colliding with an ion-propelled vehicle between first and second states of the vehicle during a space mission, the computer used to:

compute a trajectory for the vehicle to transform the vehicle from the first state to the second state, the trajectory including a plurality of initial states and a corresponding plurality of destination states, each initial state and its corresponding destination state referring to the state of the vehicle when the vehicle ejects a particular ion and when the particular ion impacts the vehicle, wherein ion flux at a silhouette of the vehicle is computed at each of the destination states; and compute total ion flux calculated over all of the destination states.

42. The method of claim 41, further comprising using the computer to compute total ion flux for at least one additional trajectory of the vehicle; and selecting the trajectory having lowest total ion flux.

* * * * *

UNITED STATES PATENT AND TRADEMARK OFFICE
CERTIFICATE OF CORRECTION

PATENT NO. : 7,650,268 B2 Page 1 of 1
APPLICATION NO. : 10/886921
DATED : January 19, 2010
INVENTOR(S) : Brian J. Tillotson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this

Twenty-third Day of November, 2010

David J. Kappos
*Director of the United States Patent and Trademark Office*